(12) United States Patent
Champagne et al.

(10) Patent No.: US 8,660,742 B2
(45) Date of Patent: Feb. 25, 2014

(54) ROAD WHEEL DISTURBANCE DETECTION

(75) Inventors: Anthony J. Champagne, Saginaw, MI (US); Michael K. Hales, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 182 days.

(21) Appl. No.: 13/303,523

(22) Filed: Nov. 23, 2011

(65) Prior Publication Data
US 2013/0131916 A1    May 23, 2013

(51) Int. Cl.
*B60T 8/172*    (2006.01)
*B60T 8/173*    (2006.01)

(52) U.S. Cl.
USPC ............................................ 701/34.4; 701/36

(58) Field of Classification Search
None
See application file for complete search history.

(56) References Cited

U.S. PATENT DOCUMENTS

| | | | | |
|---|---|---|---|---|
| 5,583,773 A | * | 12/1996 | Pfau | 701/78 |
| 6,522,968 B1 | * | 2/2003 | Ito et al. | 701/80 |
| 6,600,987 B2 | * | 7/2003 | Ohtsu | 701/71 |
| 2003/0080857 A1 | * | 5/2003 | Hartmann et al. | 340/425.5 |
| 2004/0196149 A1 | * | 10/2004 | Dufournier | 340/443 |
| 2008/0177437 A1 | * | 7/2008 | Asgari et al. | 701/31 |
| 2009/0125186 A1 | | 5/2009 | Recker et al. | |

FOREIGN PATENT DOCUMENTS

| | | |
|---|---|---|
| DE | 4405801 A1 | 8/1995 |
| DE | 19722116 A1 | 12/1997 |
| EP | 0795448 A2 | 9/1997 |
| EP | 0891904 A2 | 1/1999 |
| EP | 1600757 A1 | 11/2005 |
| JP | 2001-74758 * | 3/2001 |

OTHER PUBLICATIONS

European Search Report; Eurpoean Patent Application No. EP 12193367.5; Filing Date: Nov. 20, 2012; Dated: Mar. 19, 2013; 5 pages.

* cited by examiner

*Primary Examiner* — Michael J Zanelli
(74) *Attorney, Agent, or Firm* — Cantor Colburn LLP

(57) ABSTRACT

A control method for a vehicle is provided. The control method includes estimating a magnitude of wheel disturbance based on wheel velocity, and generating a disturbance status signal based on the magnitude of wheel disturbance.

20 Claims, 5 Drawing Sheets

ROAD WHEEL DISTURBANCE DETECTION

BACKGROUND OF THE INVENTION

The present invention relates to methods and systems of a steering system, and more particularly to methods and system for determining road wheel disturbance using wheel velocity.

Vehicles are subjected to some degree of disturbance in the front road wheels. Wheel imbalance is an example of road wheel disturbance. The road-wheel disturbance can cause vibrations in the handwheel that may be detectable by a driver. These types of vibrations are directly related to the road wheel rotational mean velocity. The severity of the vibration at the handwheel depends on the both the magnitude of the disturbance and the chassis and steering design. In a typical scenario, the vehicle driver will eventually take the vehicle in for service, to get, for example, the wheels balanced.

Accordingly, it is desirable to provide control methods and systems that detect the presence of a road wheel disturbance and provide an alert to the driver.

SUMMARY OF THE INVENTION

In one embodiment, a control method for a vehicle is provided. The control method includes estimating a magnitude of wheel disturbance based on wheel velocity, and generating a disturbance status signal based on the magnitude of wheel disturbance.

In another embodiment, a control system for a vehicle is provided. The control system includes a first module that estimates a magnitude of a wheel disturbance based on a wheel velocity. A second module generates a disturbance status based on the magnitude of the wheel disturbance.

In yet another embodiment, a system for determining road wheel disturbance in a vehicle is provided. The system includes at least one wheel sensor that generates at least one wheel signal. A control module receives the wheel signal and estimates a magnitude of wheel disturbance based on the wheel signal, and generates a disturbance status based on the magnitude of wheel disturbance.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
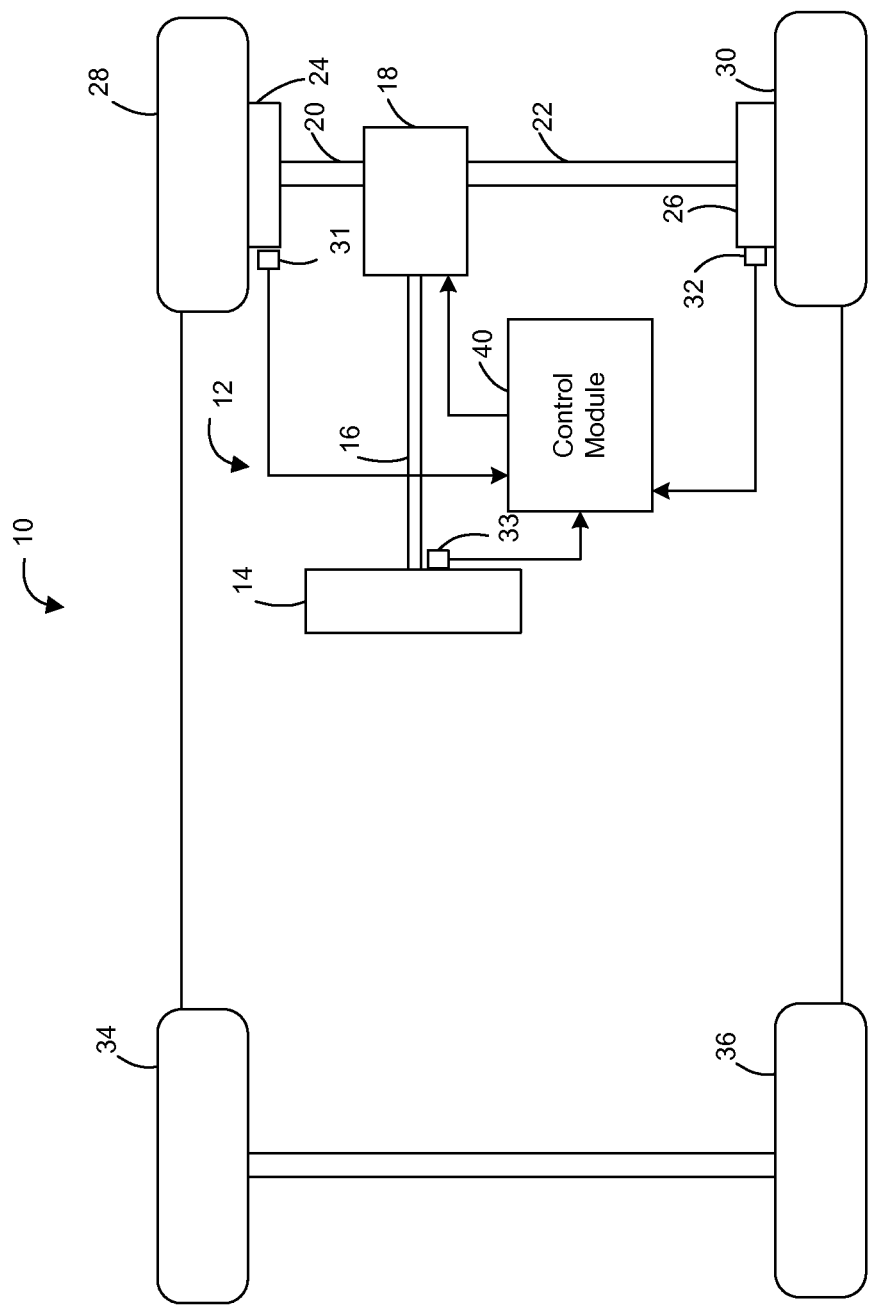
FIG. 1 is a functional block diagram illustrating a vehicle including an electric power steering control system in accordance with an exemplary embodiment of the invention.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. For exemplary purposes, the disclosure will be discussed in the context of the sensors 31, 32 that are associated with the front wheels 28, 30, respectively. As can be appreciated, other wheel sensors that sense wheel movement, such as wheel position sensors, may be used in place of the wheel speed sensors. In such a case, a wheel velocity may be calculated based on the wheel sensor signal.

A control module 40 controls the operation of the steering system 12 based on one or more of the sensor signals and further based on the steering control systems and methods of the present disclosure. Generally speaking, the steering control systems and methods of the present disclosure evaluate the wheel speed signals to determine road wheel disturbance. In various embodiments, the steering control systems and methods identify a portion of the wheel speed signal that has variation related to wheel disturbance, evaluate that portion, and generate a disturbance status signal based on the evaluation.

Figure 2:
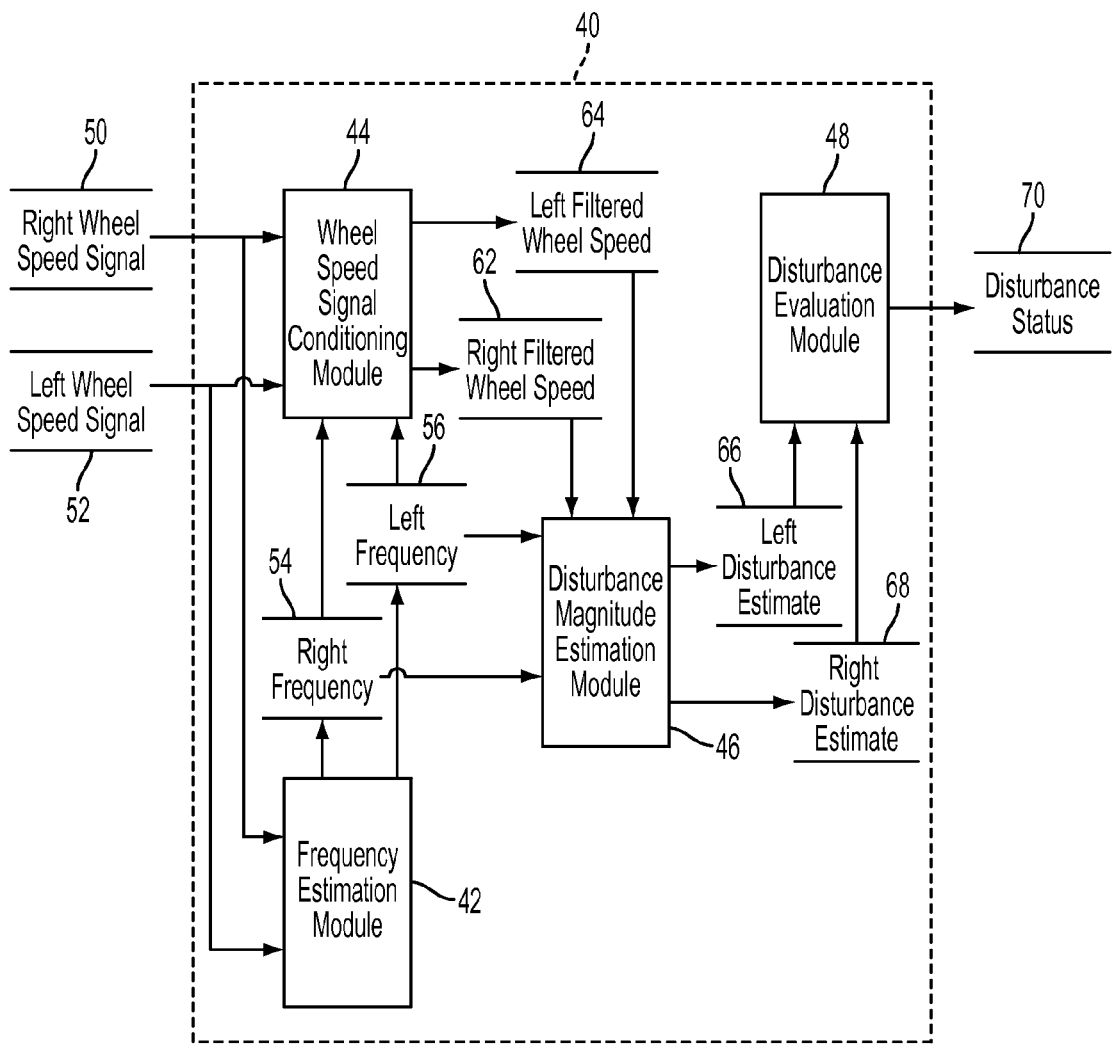
FIG. 2 is a dataflow diagram illustrating the electric power steering control system in accordance with another exemplary embodiment of the invention.

Referring now to FIG. 2, a dataflow diagram illustrates an exemplary embodiment of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly determine road wheel disturbance based on wheel speed signals. Inputs to the control module 40 can be generated from the sensors 31, 32 (FIG. 1) of the vehicle 10 (FIG. 1), can be received from other control modules (not shown) within the vehicle 10 (FIG. 1), can be modeled, and/or can be predefined.

In one example, the control module 40 includes a frequency estimation module 42, a wheel speed signal conditioning module 44, a disturbance magnitude estimation module 46, and a disturbance evaluation module 48.

The frequency estimation module 42 receives as input a right wheel speed signal 50 and a left wheel speed signal 52. The frequency estimation module estimates a frequency 54, 56 for each wheel speed signal 50, 52, respectively. For example, the frequencies 54, 56 can be estimated by scaling the wheel speed signals 50, 52 by: frequency=K/(2*π) (i.e., based on the relation: ω=2*π*frequency). In various embodiments, K is equal to one when the frequency is a first order disturbance, but may also take on other values, such as two, in the case of a second order disturbance. The frequency estimation module 42 may then apply a lowpass filter or other noise reduction filter to the frequencies to provide the frequency estimates 54, 56.

The wheel speed signal conditioning module 44 receives as input the wheel speed signals 50, 52, and the frequency estimates 54, 56. The wheel speed signal conditioning module 44 pre-conditions the wheel speed signals 50, 52 to generate filtered wheel speed signals 62, 64 using the frequency estimates 54, 56. As can be appreciated, various filtering techniques may be used to perform the conditioning. In various embodiments, a bandpass filter may be applied with a specified center frequency.

Figure 3A:
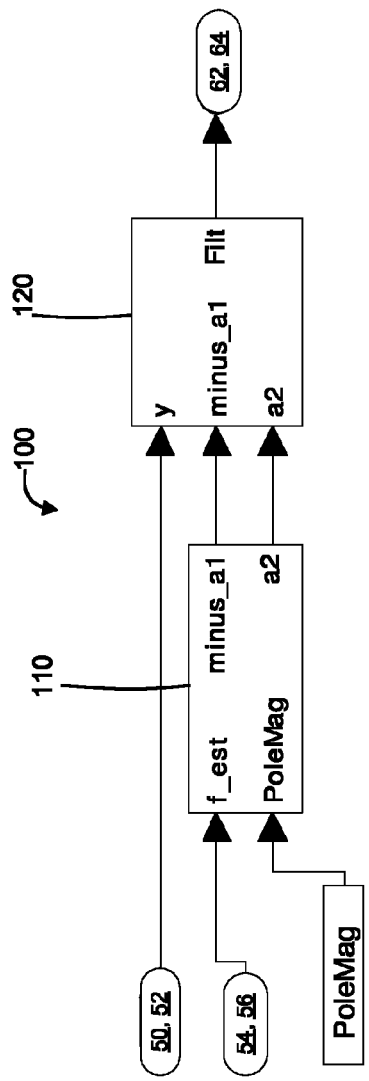
FIGS. 3A-3C, and 4 are a models illustrating exemplary electric power steering control methods and systems in accordance with yet other exemplary embodiments of the invention.
Figure 3B:
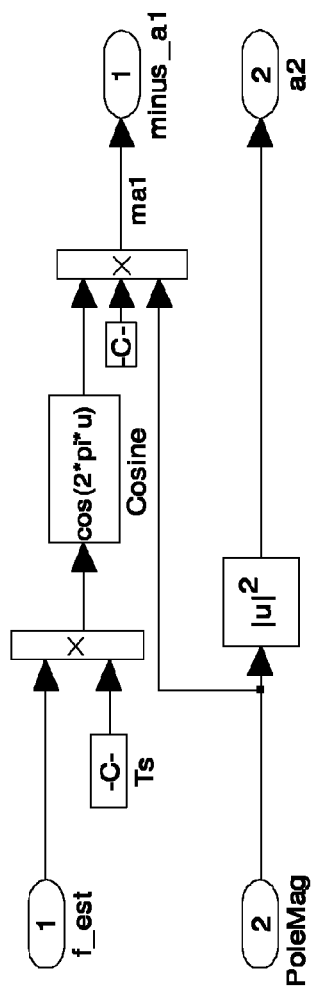
Figure 3C:
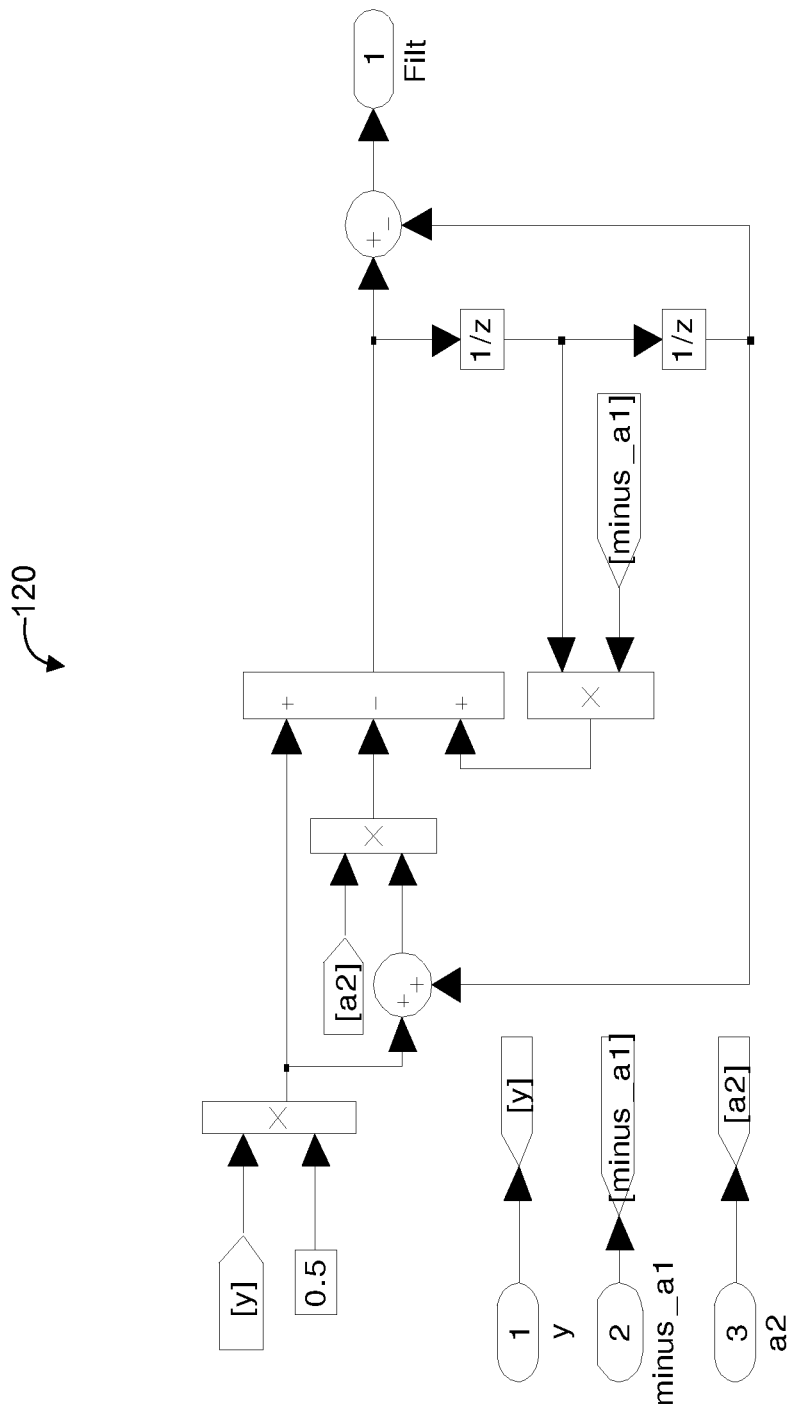

For example, as shown by the filtering methods in FIGS. 3A, 3B, and 3C, a narrowband transfer function may be applied to the wheel speed signals 50, 52. In the example, filter coefficients (minus_a1 and a2) can be calculated using the calculation method 110 based on the disturbance frequency 54, 56 (f_est) (e.g., as shown in FIG. 3B), where PoleMag is a constant used to adjust the filter bandwidth A unity gain resonator method 120 (e.g., as shown in FIG. 4C) can be performed to filter the wheel speed signals 50, 52 based on the filter coefficients.

With reference back to FIG. 2, the disturbance magnitude estimation module 46 receives as input the filtered wheel speed signals 62, 64, and the disturbance frequencies 54, 56. Based on the inputs, the disturbance magnitude estimation module 46 estimates a disturbance for each wheel speed signal 62, 64. For example, the filtered wheel speed signals 62, 64 are sinusoidal-like signals, and the oscillation magnitude can be correlated to the disturbance magnitude.

Figure 4:
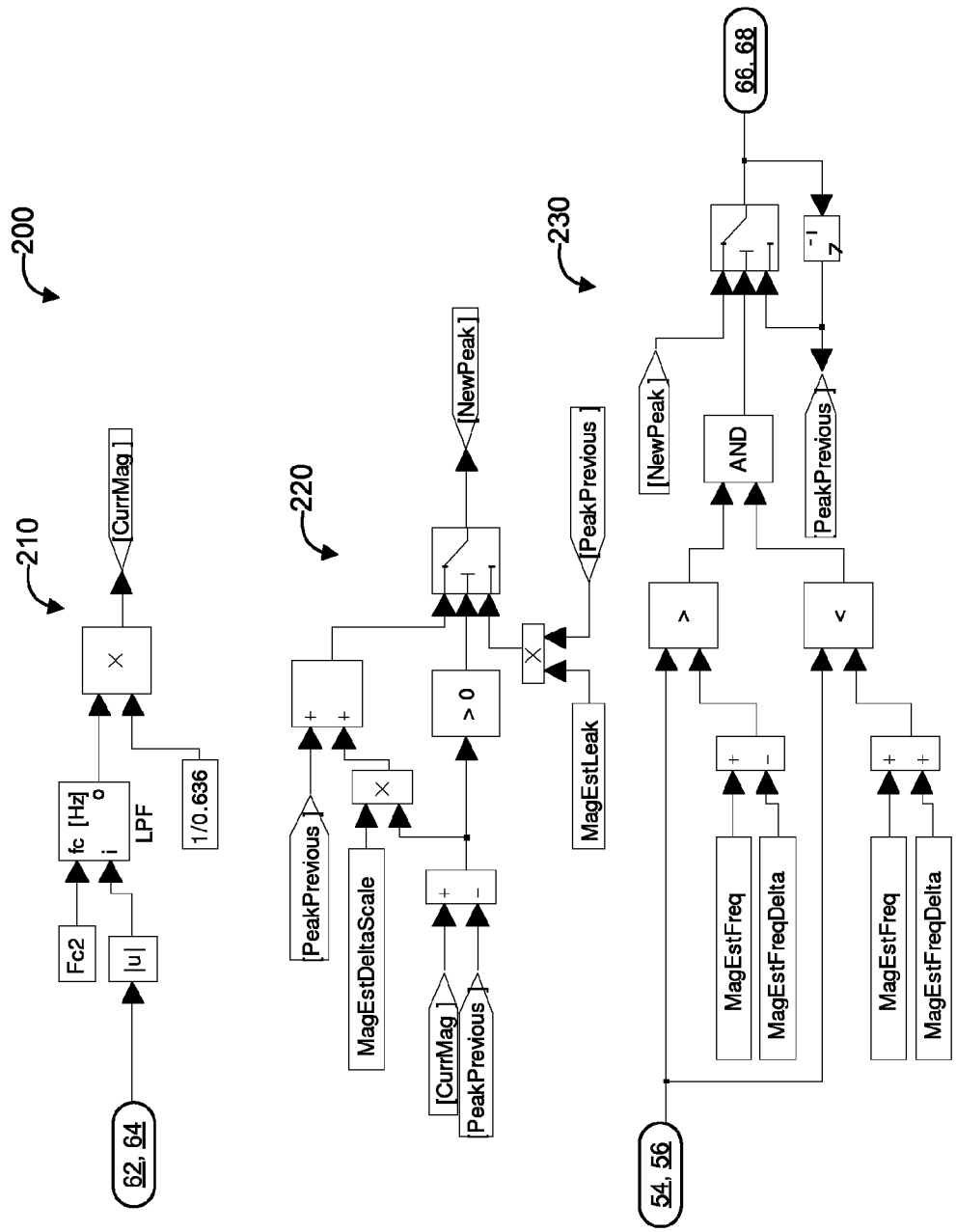

For example, as shown in FIG. 4, the current magnitude of the filtered wheel speed signal is estimated by first, taking the absolute value and, second, applying a lowpass filter at 210. In various embodiments, the corner frequency of the lowpass filter may be Fc2 Hz. The lowpass filter extracts the mean value of the absolute value of the wheel speed variation. As can be appreciated, any of a number of filtering methods may be used at 210. For sinusoidal signals, this mean value is related to the peak value by the scale factor 1/0.636. The resulting signal (CurrMag) is then an estimate of the oscillation peak amplitude.

At 220, a peak hold method is performed to minimize the effect of any non-wheel disturbance (e.g., disturbances due to road bumps). A peak (NewPeak) is determined as the output of a switch. If CurrMag is greater than PeakPrevious, then the difference multiplied by constant MagEstDeltaScale is added to PeakPrevious. In this manner, NewPeak will eventually converge to CurrMag if CurrMag remains constant. Mag-EstLeak is a constant normally very close one that allows leaking of the peak estimate in the event that the disturbance goes away.

At 230, the frequencies 54, 56 are evaluated before outputting the disturbance estimates 66, 68. For example, the estimation is performed when the frequency is within a range (MagEstFreq±MagEstFreqDelta).

With reference back to FIG. 2, the disturbance evaluation module 48 receives as input the disturbance estimates 66, 68. The disturbance evaluation module 48 compares the disturbance estimates with thresholds, and a disturbance status is generated 70 based on the comparison. For example, if either one of the disturbance estimates 66, 68 is greater than the threshold, the disturbance status 70 is set to TRUE or one. If both of disturbance estimates are less than or equal to the threshold, the disturbance status 70 is set to FALSE or zero. In various embodiments, when the disturbance status 70 is set to TRUE, the disturbance evaluation module may maintain the TRUE status for a predetermined time (e.g., an ignition cycle, until maintenance is performed, etc.)

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An alert system for a vehicle, comprising:
a first module configured to:
estimate a magnitude of a wheel disturbance based on a wheel velocity; and
reduce the magnitude of the wheel disturbance based on an effect of any non-wheel disturbance; and
a second module configured to:
generate a disturbance status based on the magnitude of the wheel disturbance; and
provide an alert to a driver of the vehicle based on the disturbance status.

2. The system of claim 1, wherein the first module is configured to estimate the magnitude of the wheel disturbance based on a variation in a wheel signal that indicates the wheel velocity.

3. The system of claim 2, wherein the first module is further configured to quantify the variation.

4. The system of claim 2 further comprising a third module configured to estimate a frequency of the wheel signal, wherein the first module is configured to estimate the magnitude of the wheel disturbance further based on the frequency.

5. The system of claim 4, wherein the first module is configured to estimate the magnitude of the wheel disturbance when the frequency is within a range.

6. The system of claim 4 further comprising a fourth module configured to process the wheel signal based on a filter.

7. The system of claim 6, wherein the filter is a bandpass filter.

8. An alert method for a vehicle, comprising:
estimating a disturbance frequency based on a wheel velocity;
processing the wheel velocity using the estimated disturbance frequency;

estimating a magnitude of a wheel disturbance based on-a the processed wheel velocity;

generating a disturbance status signal based on the magnitude of the wheel disturbance; and providing an alert to a driver of the vehicle based on the disturbance status signal.

9. The control method of claim 8, wherein the estimating the magnitude of the wheel disturbance is based on a variation in a wheel signal that indicates the wheel velocity.

10. The control method of claim 9, further comprising quantifying the variation.

11. The method of claim 8, wherein the estimating the magnitude of the wheel disturbance is further based on the disturbance frequency.

12. The method of claim 8, wherein the estimating the magnitude of the wheel disturbance occurs when the disturbance frequency is within a range.

13. The method of claim 9 further comprising processing the wheel signal based on a filter.

14. The method of claim 13, wherein the filter is a bandpass filter.

15. A system for determining road wheel disturbance in a vehicle, comprising:

at least one wheel sensor that generates at least one wheel signal; and a control module configured to:

receive the wheel signal;

estimate a magnitude of the wheel disturbance based on the wheel signal;

reduce the magnitude of the wheel disturbance based on an effect of any non-wheel disturbance;

generate a disturbance status based on the magnitude of wheel disturbance; and provide an alert to a driver of the vehicle based on the disturbance status.

16. The system of claim 15, wherein the control module is configured to estimate the magnitude of wheel disturbance based on a variation in the wheel signal that indicates a wheel velocity.

17. The system of claim 16, wherein the control module is further configured to quantify the variation.

18. The system of claim 15, wherein the control module is further configured to:

estimate a frequency of the wheel signal; and estimate the magnitude of the wheel disturbance further based on the frequency.

19. The system of claim 18, wherein the control module is configured to estimate the magnitude of the wheel disturbance when the frequency is within a range.

20. The system of claim 15, wherein the control module processes the wheel signal based on a filter.

* * * * *